US011922257B2

(12) United States Patent
Zhang et al.

(10) Patent No.: US 11,922,257 B2
(45) Date of Patent: Mar. 5, 2024

(54) SIGNAL PROCESSING METHODS AND RFID SYSTEM

(71) Applicant: INSTITUTE OF MICROELECTRONICS OF THE CHINESE ACADEMY OF SCIENCES, Beijing (CN)

(72) Inventors: Feng Zhang, Beijing (CN); Zhisheng Chen, Beijing (CN)

(73) Assignee: INSTITUTE OF MICROELECTRONICS OF THE CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/995,859

(22) PCT Filed: Sep. 29, 2020

(86) PCT No.: PCT/CN2020/119027
§ 371 (c)(1),
(2) Date: Oct. 9, 2022

(87) PCT Pub. No.: WO2022/011843
PCT Pub. Date: Jan. 20, 2022

(65) Prior Publication Data
US 2023/0140784 A1 May 4, 2023

(30) Foreign Application Priority Data

Jul. 16, 2020 (CN) .......................... 202010686435.1

(51) Int. Cl.
*G06K 7/10* (2006.01)
(52) U.S. Cl.
CPC ............................... *G06K 7/10366* (2013.01)

(58) Field of Classification Search
None
See application file for complete search history.

(56) References Cited

U.S. PATENT DOCUMENTS

2009/0110087 A1\* 4/2009 Liu ....................... H04L 5/0007
375/260

FOREIGN PATENT DOCUMENTS

| CN | 101346734 A | \* | 1/2009 | ........... G06K 7/0008 |
| CN | 101346734 A | | 1/2009 | |

(Continued)

OTHER PUBLICATIONS

International Search Report prepared by the State Intellectual Property Office of the P.R. China for PCT/CN2020/119027, dated Apr. 15, 2021, 4 pages.

(Continued)

*Primary Examiner* — Kristy A Haupt
(74) *Attorney, Agent, or Firm* — Syncoda LLC; Feng Ma

(57) ABSTRACT

A signal processing method is applied to an RFID electronic tag, and includes: coding a digital baseband signal to obtain a coded signal; performing phase-shift keying modulation on the coded signal to obtain a first modulated signal; performing OFDM modulation on the first modulated signal to obtain a second modulated signal; and sending the second modulated signal to an RFID reader, by means of which the OFDM demodulation, phase-shift keying demodulation, and decoding are performed sequentially on the second modulated signal. According to the signal processing method and device, and the RFID system of one or more embodiments of present disclosure, the RFID system can be caused to effectively utilize bandwidth, thereby achieving high-speed transmission of signals and significantly reducing a bit error ratio of signal transmission.

7 Claims, 6 Drawing Sheets

(56) References Cited

FOREIGN PATENT DOCUMENTS

CN           101409699 A      4/2009
EP             2190123 A2 *  5/2010   ............ H03M 13/11

OTHER PUBLICATIONS

Written Opinion prepared by the State Intellectual Property Office of the P.R. China for PCT/CN2020/119027, dated Apr. 15, 2021, 3 pages.
First Office Action prepared by the State Intellectual Property Office of the P.R. China for 202010686435.1, dated Jun. 28, 2021, 9 pages.

* cited by examiner

SIGNAL PROCESSING METHODS AND RFID SYSTEM

CROSS-REFERENCE TO RELATED APPLICATIONS

This application is a national stage of International Application No. PCT/CN2020/119027 filed on Sep. 29, 2020, which claims priority to Chinese Patent Application No. 202010686435.1 filed on Jul. 16, 2020. The disclosures content of which is the above-referenced applications are hereby incorporated by reference in their entirety.

TECHNICAL FIELD

The present disclosure belongs to the technical field of radio frequency identification, and in particular, to a signal processing method and device, and an RFID system.

BACKGROUND

With rapid development of Internet of Things (IOT) technology, RFID (Radio Frequency Identification) technology, as one of the key techniques of perception layer of IOT, has attracted more and more attention. An RFID system includes an electronic tag, a reader and an application software system, and its fundamental operating principle is that: upon entering a magnetic field generated by the reader, the electronic tag receives a RF signal sent by the reader, and sends out a product information stored in a chip by using the energy obtained from induced current; alternatively, the electronic tag sends a signal of a certain frequency in an initiative manner, then the reader reads and decodes this information, and sends it to the application software system for related data processing. Transmission of signal to the reader by the electronic tag is usually carried out through load modulation. The load modulation refers to adjusting electrical parameters of an oscillating circuit in the electronic tag in accordance of cycle time of data stream so that the impedance and phase of the electronic tag change accordingly. The load modulation mainly includes two modes, i.e., resistive load modulation and capacitive load modulation.

FIG. 1 is a circuit diagram of resistive load modulation. In the resistive load modulation, a modulation resistor R1 and a control switch S are connected in series and then in parallel with a load resistor R0, wherein turn-on and turn-off of the control switch S is controlled by binary data code. When the binary data code is "1", the control switch S is turned on, and a load of the electronic tag is an outcome of connecting the modulation resistor R1 and the load resistor R0 in parallel. When the binary data code is "0", the control switch S is turned off, and a load of the electronic tag is the modulation resistor R1. In the case that the control switch S is turned on, the load of the electronic tag is lower. For parallel resonance, a quality factor decreases if a parallel resistance was low. In other words, in the case that the load of the electronic tag is low, the quality factor decreases, as a result of which a voltage drop across ends of a resonant loop is caused. Therefore, a voltage across ends of the resonant loop is changed due to turn-on and turn-off of the control switch S. When the voltage across ends of the resonant loop changes, this change is transmitted to the reader due to inductive coupling, and is present as change in the amplitude of a voltage across coils of the reader, thereby implementing voltage amplitude modulation on the reader.

FIG. 2 is a circuit diagram of capacitive load modulation. In the capacitive load modulation, a modulation capacitor C1 and a control switch S are connected in series and then in parallel with a load resistor R0. Due to connection of the modulation capacitor C1, a resonant loop is detuned, as a result of which the reader is also detuned. Turn-on and turn-off of the switch S are controlled so that a resonant frequency of the electronic tag is switched between two frequencies. Through qualitative analysis, it can be known that connection of the modulation capacitor C1 reduces a voltage across coils of the electronic tag and increases a voltage across coils of the reader. While change of waveform through the capacitive load modulation is similar to change of waveform through the resistive load modulation, the voltage across the coils of the reader changes not only in amplitude but also in phase.

As a data transmission rate is getting faster and faster, a capacity of the electronic tags is increasing gradually. Although these two load modulation modes are simple, they are impossible to satisfy the sharp increase in data transmission and thus not applicable to high-speed propagation of signals.

SUMMARY

In view of the problem in the existing technology, the present disclosure provides a signal processing method and device, and an RFID system, to address the problem that the existing load modulation mode of the RFID system is not applicable to high-speed propagation of signals.

In a first aspect of the present disclosure, a signal processing method applied to an RFID electronic tag is provided, which may comprise: encoding a digital baseband signal to obtain a coded signal; performing a phase shift keying (PSK) modulation on the coded signal to obtain a first modulated signal; performing an orthogonal frequency division multiplexing (OFDM) modulation on the first modulated signal to obtain a second modulated signal; and sending the second modulated signal to an RFID reader, by means of which an OFDM demodulation, PSK demodulation and decoding are performed in turn on the second modulated signal.

In some embodiments, the encoding the digital baseband signal comprises: using a Gray code coding algorithm to encode the digital baseband signal.

In some embodiments, the performing the PSK modulation on the coded signal comprises: using an 8-PSK modulation algorithm to perform the PSK modulation on the coded signal.

In some embodiments, the performing the OFDM modulation on the first modulated signal comprises: inserting pilots to the first modulated signal to obtain a first serial signal; performing a serial-to-parallel conversion on the first serial signal to obtain N first parallel signals, N being the number of subcarriers; performing an inverse discrete fast Fourier transform (IDFFT) on the N first parallel signals to obtain N second parallel signals; performing a parallel-to-serial conversion on the N second parallel signals to obtain a second serial signal; and adding cyclic prefixes to the second serial signal to obtain the second modulated signal.

In a second aspect of the disclosure, a signal processing method applied to an RFID reader is further provided comprising: receiving a RF signal from an RFID electronic tag, wherein the RF signal is a signal obtained by performing encoding, PSK modulation and OFDM modulation in turn on a digital baseband signal by the RFID electronic tag; performing an OFDM demodulation on the RF signal to obtain a first demodulated signal; performing a PSK demodulation on the first demodulated signal to obtain a second demodulated signal; and decoding the second demodulated signal to obtain the digital baseband signal.

In some embodiments, the performing the PSK demodulation on the first demodulated signal comprises: using an 8-PSK demodulation algorithm to perform the PSK demodulation on the first demodulated signal.

In some embodiments, the decoding the second demodulated signal comprises: using a Gray code decoding algorithm to decode the second demodulated signal.

In a third aspect of the disclosure, a signal processing device applied to an RFID electronic tag is provided comprising: a coding module for encoding a digital baseband signal to obtain a coded signal; a PSK modulation module for performing a PSK modulation on the coded signal to obtain a first modulated signal; an OFDM modulation module for performing an OFDM modulation on the first modulated signal to obtain a second modulated signal; and a sending module for sending the second modulated signal to an RFID reader, wherein the RFID reader performs the OFDM demodulation, PSK demodulation and decoding in turn on the second modulated signal.

In a fourth aspect of the disclosure, a signal processing device applied to an RFID reader is provided comprising: a receiving module for receiving a RF signal from an RFID electronic tag, wherein the RF signal is a signal obtained by performing encoding, PSK modulation and OFDM modulation in turn on a digital baseband signal by the RFID electronic tag; an OFDM demodulation module for performing the OFDM demodulation on the RF signal to obtain a first demodulated signal; a PSK demodulation module for performing the PSK demodulation on the first demodulated signal to obtain a second demodulated signal; and a decoding module for decoding the second demodulated signal to obtain the digital baseband signal.

In a fifth aspect of the disclosure, an RFID system is provided comprising an RFID electronic tag and an RFID reader, wherein the RFID electronic tag encodes a digital baseband signal to obtain a coded signal; the RFID electronic tag performs a PSK modulation on the coded signal to obtain a first modulated signal; the RFID electronic tag performs an OFDM modulation on the first modulated signal to obtain a second modulated signal; the RFID electronic tag sends the second modulated signal to the RFID reader; the RFID reader receives the second modulated signal from the RFID electronic tag; the RFID reader performs an OFDM demodulation on the second modulated signal to obtain a first demodulated signal; the RFID reader performs a PSK demodulation on the first demodulated signal to obtain a second demodulated signal; and the RFID reader decodes the second demodulated signal to obtain the digital baseband signal.

In a sixth aspect of the present disclosure, an electronic device is provided comprising a memory, a processor, and a computer program stored on the memory and executable on the processor, wherein the processor, when executing the computer program, implements the steps of the signal processing methods as described above.

In a seventh aspect of the present disclosure, a computer-readable storage medium is provided, on which a computer program is stored, wherein the computer program, when being executed by a processor, implements the steps of the signal processing methods as described above.

With the signal processing methods, devices, and RFID system according to one or more embodiments of the present disclosure, a new modulation mode is adopted during communication between the RFID electronic tag and the RFID reader, i.e., performing encoding, PSK modulation and OFDM modulation in turn on a digital baseband signal. Through a modulation mode of PSK modulation, the RFID system can utilize the bandwidth more effectively, thereby realizing high-speed transmission of signals. In addition, with speeding-up of the transmission rate, the RFID system might endure with transmission with long distance or transmission with large noise in channels, and inter-channel interference (ICI) and inter-symbol interference (ISI) that should have not been concerned will affect transmission of signals, resulting in increase of a bit error rate. However, through the processing of encoding and OFDM modulation, the interference in signal transmission that is resulted from the inter-channel interference and the inter-symbol interference can be effectively prevented, and the possibility of error data can be reduced. Therefore, the signal processing methods provided by the present disclosure can also significantly reduce the bit error rate of signal transmission.

BRIEF DESCRIPTION OF THE DRAWINGS

Various other advantages and benefits will become apparent to those of ordinary skill in the art upon reading the detailed description of the following preferred embodiments. The drawings are for the purpose of illustrating the preferred embodiments only and should not to be considered limiting of the present disclosure. Also, the same reference numerals are applied to denote identical components throughout the drawings. In the figures.

DETAILED DESCRIPTION

Figure 1:
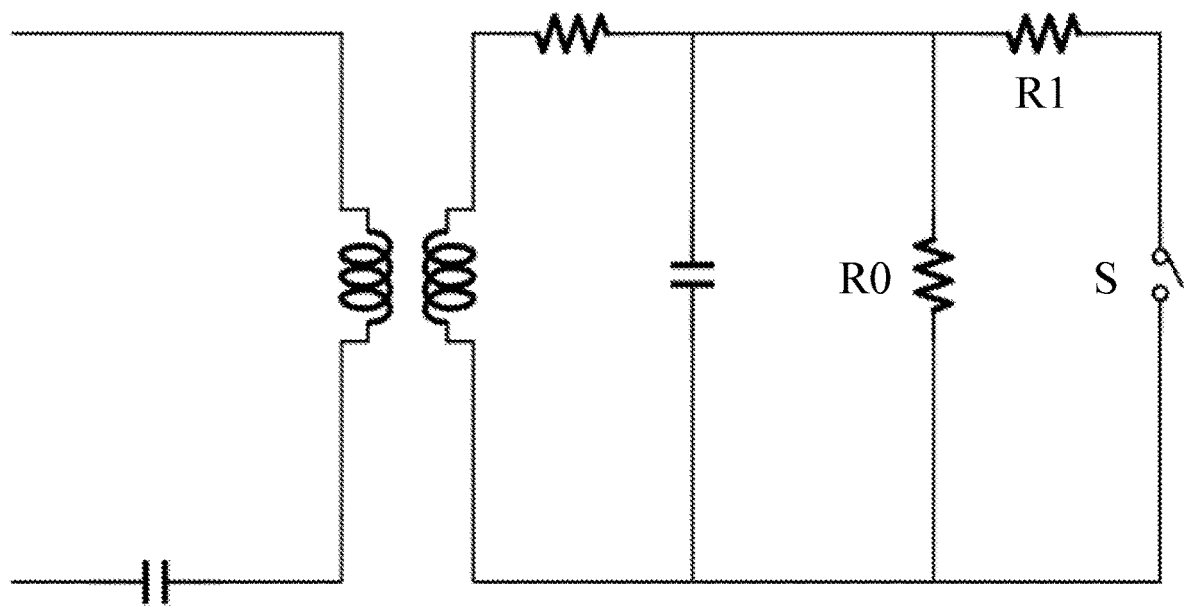
FIG. 1 is a circuit diagram of existing resistive load modulation.
Figure 2:
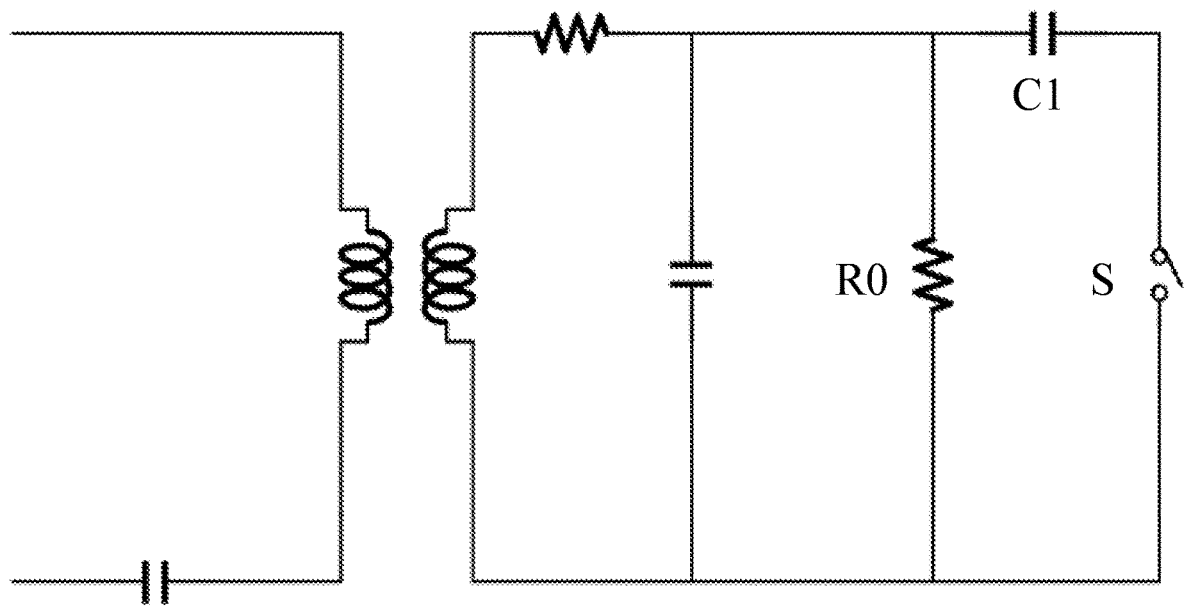
FIG. 2 is a circuit diagram of existing capacitive load modulation.

Exemplary embodiments of the present disclosure will be described in more detail below with reference to the accompanying drawings. While exemplary embodiments of the present disclosure are illustrated in the drawings, it should be understood that the present disclosure may be embodied in various forms and should not be limited by the embodiments set forth herein. Rather, these embodiments are provided so that the present disclosure will be more thoroughly understood and the scope of the present disclosure will be fully conveyed to those skilled in the art.

The technical solutions of the present disclosure will be further described in detail below through the accompanying drawings and specific embodiments.

Figure 3:
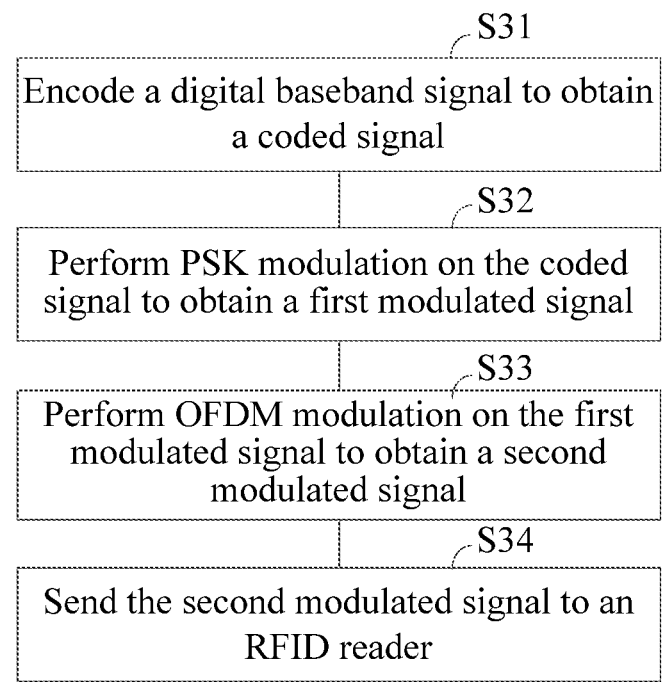
FIG. 3 is a flowchart of a signal processing method according to some embodiments of the present disclosure.

In a first aspect of the present disclosure, provided is a signal processing method, which is applied to an RFID electronic tag. FIG. 3 is a flowchart of the signal processing method, which includes:

Step S31, encoding a digital baseband signal to obtain a coded signal;

Step S32, performing phase shift keying (PSK) modulation on the coded signal to obtain a first modulated signal;

Step S33, performing orthogonal frequency division multiplexing (OFDM) modulation on the first modulated signal to obtain a second modulated signal; and Step S34, sending the second modulated signal to an RFID reader.

The digital baseband signal is a signal corresponding to data that needs to be sent to the RFID reader by the RFID electronic tag, and is generated by a control circuit of the RFID electronic tag. Encoding the digital baseband signal is to perform channel coding, which can improve stability of data transmission and overcome problems of a wireless channel, such as path loss, multipath, and shadowing. In some embodiments, the digital baseband signal is encoded using a Gray code coding algorithm. Apparently, other coding algorithms such as RS coding algorithm, convolutional code coding algorithm, etc. may also be used to encode the digital baseband signal, which is not limited in the present disclosure.

Figure 4:
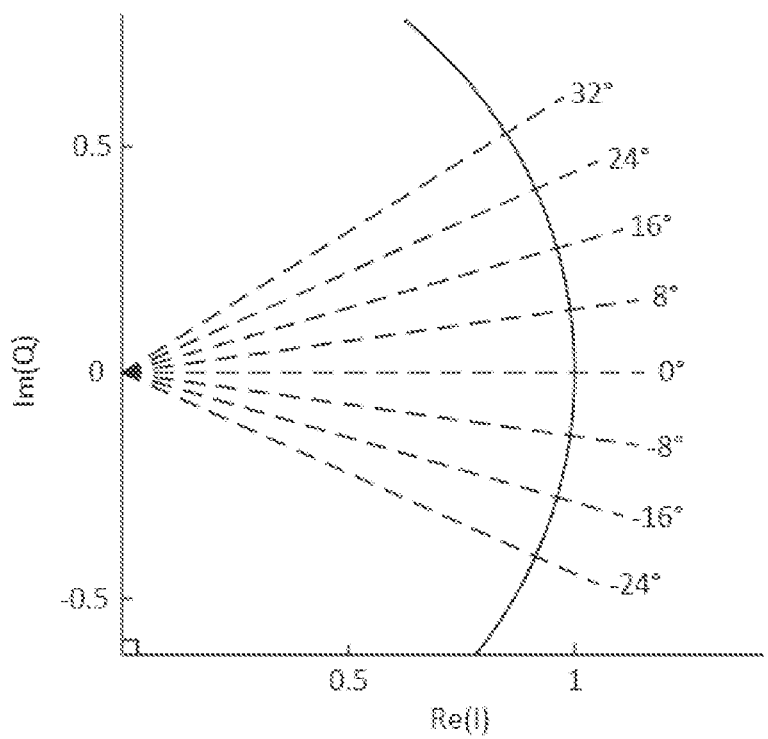
FIG. 4 is a schematic diagram of 8-phase shift keying modulation according to some embodiments of the present disclosure.

Upon obtaining the coded signal, phase shift keying (PSK) modulation is performed on the coded signal. In some implementations, an 8-phase shift keying (8-PSK) modulation algorithm is adopted to perform the PSK modulation on the coded signal. FIG. 4 is a schematic diagram of 8-PSK modulation according to some embodiments of the present disclosure. For the 8-PSK modulation, eight symbols correspond to eight phases on complex plane, respectively. Binary information is coded into 8 symbols, and each of the symbols may be coded into 3 bits, thereby greatly improving the data transmission rate.

Figure 5:
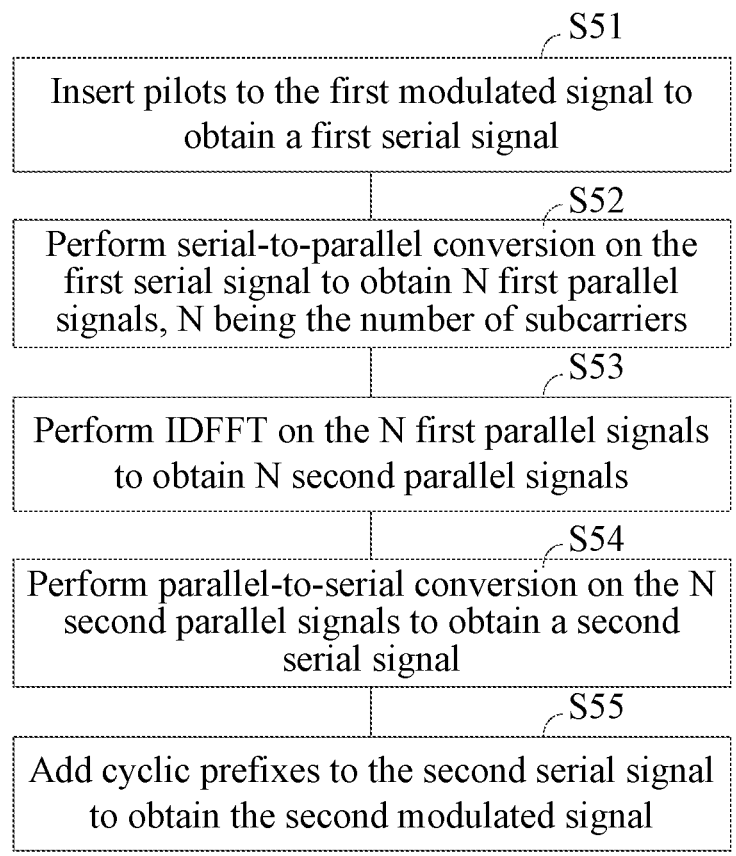
FIG. 5 is a flowchart of an OFDM modulation method according to some embodiments of the present disclosure.

Due to strong inter-symbol interference resulted from the PSK modulation, upon obtaining the first modulated signal, OFDM modulation is performed on the first modulated signal to reduce an impact resulted from the inter-symbol interference. FIG. 5 is a flowchart of performing OFDM modulation on the first modulated signal according to some embodiments of the present disclosure, and performing OFDM modulation on the first modulated signal includes:

Step S51, inserting pilots to the first modulated signal to obtain a first serial signal;

Step S52, performing serial-to-parallel conversion on the first serial signal to obtain N first parallel signals, N being the number of subcarriers;

Step S53, performing inverse discrete fast Fourier transform (IDFFT) on the N first parallel signals to obtain N second parallel signals;

Step S54, performing parallel-to-serial conversion on the N second parallel signals to obtain a second serial signal; and Step S55, adding cyclic prefixes to the second serial signal to obtain the second modulated signal.

Due to the randomness of channel noise and the influence of multipath of channel, in order to restore the original data, it is necessary to perform estimation on a channel in the RFID reader to obtain an absolute reference phase and amplitude of each subcarrier of an OFDM symbol so that the original data can be restored without error. The accuracy of channel estimation directly affects the performance of the entire OFDM modulation. In some embodiments, channel information is estimated by inserting pilots. As a wireless channel changes over time and the channel has different effects on signals of different frequencies, if it is intended to know an actual amplitude and phase of a signal, it is necessary to obtain amplitude and phase changes of the signal caused by the channel. By inserting pilots into the first modulated signal, the pilots are sent to the RFID reader along with data to be sent to the RFID reader. The RFID reader can know the amplitude and phase changes of a signal by analyzing the signal it receives. The pilots are a string of data that has been known, and inserting pilots into the first modulated signal is to perform insertion of the pilots at several specific frequencies of the first modulated signal. Data at these specific frequencies are processed in the RFID reader, and a condition of the entire channel can be estimated from channel conditions at these locations. It should be noted that the specific frequencies can be selected according to an actual application scenario as long as the energy of the pilots can be effectively distinguished from the energy of the data to be sent to the RFID reader.

As there is multipath phenomenon in the wireless channel, a signal travels from a transmitting terminal to a receiving terminal through a plurality of paths, which result in different time delays of signal propagation due to their different distances. Signal components with different delays are superimposed together, as a result of which mutual interference among code elements has been caused. In order to address the problem of crosstalk among code elements caused by the multipath, a code-element time can be increased. When the code element time is much longer than delays in the channel, the influence of the crosstalk among code elements on code-element decision will be greatly reduced, but the transmission rate of code element is also decreased subsequently. In order to effectively reduce the influence of the crosstalk among code elements and also to have an impact on the transmission rate of code elements as little as possible, a guard interval can be inserted between OFDM symbols. A length of the guard interval is usually longer than maximum delay spread of the wireless channel, so that multipath components of one symbol cannot interfere the next symbol. In some embodiments, in order not to destroy orthogonality of the subcarriers, a guard interval is inserted by using a cyclic prefix, i.e., moving a part of an OFDM symbol ahead of the symbol for transmission.

It should be noted that, in the OFDM modulation process, symbol period, carrier frequency spacing and the number of subcarriers can be selected according to an actual application scenario. According to the relevant knowledge of communication systems, it is known that duration of the symbol period affects carrier frequency spacing as well as delay time of encoding modulation. If a fixed digital modulation is used, the longer the symbol period is, the stronger the anti-interference ability of a system is, but the larger number of carriers and the larger computing scale are also required.

Upon obtaining the second modulated signal, the second modulated signal is sent to the RFID reader, and the RFID reader performs OFDM demodulation, PSK demodulation and decoding in turn on the second modulated signal.

With the signal processing method provided by the present disclosure, a new modulation mode is adopted during communication between the RFID electronic tag and the RFID reader, that is, encoding, PSK modulation and OFDM modulation are performed in turn on the digital baseband signal. Through a modulation mode of PSK modulation, the RFID system can be caused to utilize the bandwidth more effectively, thereby realizing high-speed signal transmission. In addition, with speeding-up of the transmission rate, the RFID system might endure with transmission of long-distance or transmission with large noise in channels, thus inter-channel interference and inter-symbol interference that should have not been concerned will affect transmission of a signal, resulting in increase of a bit error rate. However, through the processing of encoding and OFDM modulation, the interference in signal transmission that is resulted from the inter-channel interference and the inter-symbol interference can be effectively prevented, and the possibility of error data can be reduced. Therefore, the signal processing method provided by the present disclosure can also significantly reduce the bit error rate of signal transmission.

Figure 6:
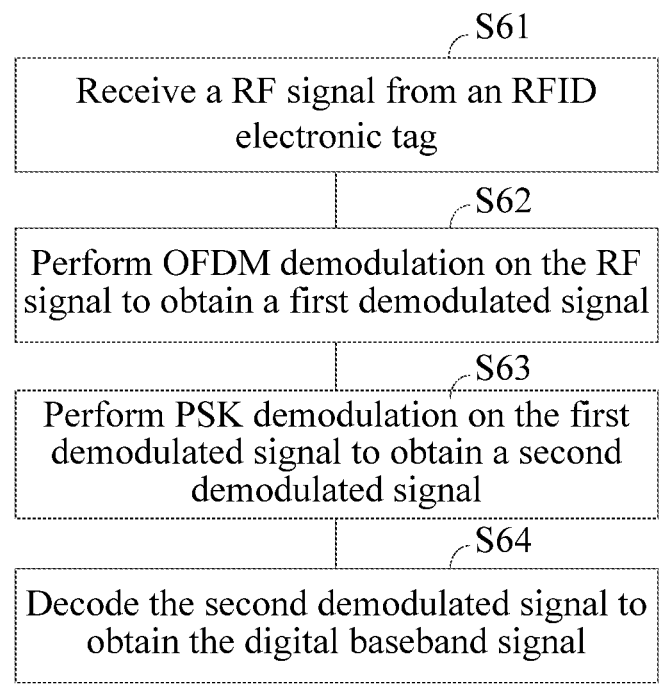
FIG. 6 is a flowchart of a signal processing method according to other embodiments of the present disclosure.

In a second aspect of the present disclosure, another signal processing method is further provided, which is applied to the RFID reader. FIG. 6 is a flowchart of the signal processing method, which may include:

Step S61, receiving a radio frequency (RF) signal from the RFID electronic tag;

Step S62, performing OFDM demodulation on the RF signal to obtain a first demodulated signal;

Step S63, performing PSK demodulation on the first demodulated signal to obtain a second demodulated signal; and Step S64, decoding the second demodulated signal to obtain the digital baseband signal.

The RF signal is a signal obtained by performing encoding, PSK modulation and OFDM modulation in turn on a digital baseband signal by the RFID electronic tag, that is, it is the second modulated signal described above.

The performing OFDM demodulation on the RF signal corresponds to the above-mentioned performing OFDM modulation on the first modulated signal. In some embodiments, performing OFDM demodulation on the RF signal includes:

removing a cyclic prefix in the RF signal to obtain a third serial signal;

performing a serial-to-parallel conversion on the third serial signal to obtain N third parallel signals;

performing discrete fast Fourier transform (DFFT) on the N third parallel signals to obtain N fourth parallel signals;

performing parallel-to-serial conversion on the N fourth parallel signals to obtain a fourth serial signal; and, performing channel estimation on the fourth serial signal to obtain a first demodulated signal.

The performing PSK demodulation on the first demodulated signal corresponds to the above-mentioned performing PSK modulation on the coded signal. In some embodiments, the performing PSK demodulation on the first demodulated signal may include: using an 8-PSK demodulation algorithm to perform the PSK demodulation on the first demodulated signal.

The decoding the second demodulated signal corresponds to the above-mentioned coding the digital baseband signal. In some embodiments, the decoding on the second demodulated signal may include: using a Gray code decoding algorithm to decode the second demodulated signal.

In a third aspect of the present disclosure, further provided is a signal processing device, which is applied to the RFID electronic tag, and the signal processing device may include:

a coding module for encoding a digital baseband signal to obtain a coded signal;

a PSK modulation module for performing PSK modulation on the coded signal to obtain a first modulated signal;

an OFDM modulation module for performing OFDM modulation on the first modulated signal to obtain a second modulated signal; and a sending module for sending the second modulated signal to an RFID reader, wherein the RFID reader performs OFDM demodulation, PSK demodulation and decoding in turn on the second modulated signal.

In some embodiments, the coding module adopts a Gray code coding algorithm to encode the digital baseband signal.

In some embodiments, the PSK modulation module adopts an 8-PSK modulation algorithm to perform the PSK modulation on the coded signal.

In some embodiments, the OFDM modulation module includes:

an inserting module for inserting pilots to the first modulated signal to obtain a first serial signal;

a first serial-to-parallel conversion module for performing serial-to-parallel conversion on the first serial signal to obtain N first parallel signals, N being the number of subcarriers;

an IDFFT module for performing IDFFT on the N first parallel signals to obtain N second parallel signals;

a first parallel-to-serial conversion module for performing parallel-to-serial conversion on the N second parallel signals to obtain a second serial signal;

a prefix adding module for adding cyclic prefixes to the second serial signal to obtain a second modulated signal.

In a fourth aspect of the present disclosure, further provided is another signal processing device, which is applied to the RFID reader, and the another signal processing device includes:

a receiving module for receiving a RF signal from the RFID electronic tag, wherein the RF signal is a signal obtained by performing encoding, PSK modulation and OFDM modulation in turn on a digital baseband signal by the RFID electronic tag;

an OFDM demodulation module for performing OFDM demodulation on the RF signal to obtain a first demodulated signal;

a PSK demodulation module for performing PSK demodulation on the first demodulated signal to obtain a second demodulated signal; and a decoding module for decoding the second demodulated signal to obtain the digital baseband signal.

In some embodiments, the OFDM demodulation module includes:

a de-prefixing module for removing cyclic prefixes in the RF signal to obtain a third serial signal;

a second serial-to-parallel conversion module, for performing serial-to-parallel conversion on the third serial signal to obtain N third parallel signals;

a DFFT module for performing DFFT on the N third parallel signals to obtain N fourth parallel signals;

a second parallel-to-serial conversion module for performing parallel-to-serial conversion on the N fourth parallel signals to obtain a fourth serial signal;

a channel estimation module for perform channel estimation on the fourth serial signal to obtain the first demodulated signal.

In some embodiments, the PSK demodulation module adopts an 8-PSK demodulation algorithm to perform the PSK demodulation on the first demodulated signal.

In some embodiments, the decoding module adopts a Gray code decoding algorithm to decode the second demodulated signal.

In a fifth aspect of the present disclosure, further provided is an RFID system, which includes an RFID electronic tag and an RFID reader;

The RFID electronic tag encodes a digital baseband signal to obtain an coded signal;

The RFID electronic tag performs PSK modulation on the coded signal to obtain a first modulated signal;

The RFID electronic tag performs OFDM modulation on the first modulated signal to obtain a second modulated signal;

The RFID electronic tag sends the second modulated signal to the RFID reader;

The RFID reader receives the second modulated signal from the RFID electronic tag;

The RFID reader performs OFDM demodulation on the second modulated signal to obtain a first demodulated signal;

The RFID reader performs PSK demodulation on the first demodulated signal to obtain a second demodulated signal; and The RFID reader decodes the second demodulated signal to obtain the digital baseband signal.

The specific approaches how the RFID reader and the RFID electronic tag perform operations have been described in detail previously, and will not be described any further here.

In a sixth aspect of the present disclosure, further provided is an electronic device, comprising a memory, a processor and a computer program stored on the memory and executable on the processor, wherein the processor, when executing the computer program, implements the steps of the signal processing methods as described above.

In a seventh aspect of the present disclosure, further provided is a computer-readable storage medium on which a computer program is stored, wherein the computer program, when being executed by a processor, implements the steps of the signal processing methods as described above.

These above are only embodiments of the present disclosure, and are not intended to limit the protection scope of the present disclosure. Any modifications, equivalent replacements and improvements made within the spirit and principle of the present disclosure should fall within the scope of protection of the present disclosure.

What is claimed is:

1. A signal processing method applied to an RFID electronic tag, comprising:
   encoding a digital baseband signal to obtain a coded signal;
   performing a phase shift keying (PSK) modulation on the coded signal to obtain a first modulated signal;
   performing an orthogonal frequency division multiplexing (OFDM) modulation on the first modulated signal to obtain a second modulated signal; and
   sending the second modulated signal to an RFID reader, by means of which an OFDM demodulation, PSK demodulation and decoding are performed in turn on the second modulated signal;
   wherein the performing the OFDM modulation on the first modulated signal comprises:
   inserting pilots to the first modulated signal to obtain a first serial signal;
   performing a serial-to-parallel conversion on the first serial signal to obtain N first parallel signals, N being the number of subcarriers;
   performing an inverse discrete fast Fourier transform (IDFFT) on the N first parallel signals to obtain N second parallel signals;
   performing a parallel-to-serial conversion on the N second parallel signals to obtain a second serial signal; and
   adding cyclic prefixes to the second serial signal to obtain the second modulated signal.

2. The signal processing method according to claim 1, wherein the encoding the digital baseband signal comprises: using a Gray code coding algorithm to encode the digital baseband signal.

3. The signal processing method according to claim 1, wherein the performing the PSK modulation on the coded signal comprises:
   using an 8-PSK modulation algorithm to perform the PSK modulation on the coded signal.

4. A signal processing method applied to an RFID reader, comprising:
   receiving a radio frequency (RF) signal from an RFID electronic tag, wherein the RF signal is a signal obtained by performing encoding, PSK modulation and OFDM modulation in turn on a digital baseband signal by the RFID electronic tag;
   performing an OFDM demodulation on the RF signal to obtain a first demodulated signal;
   performing a PSK demodulation on the first demodulated signal to obtain a second demodulated signal; and
   decoding the second demodulated signal to obtain the digital baseband signal;
   wherein the performing the OFDM demodulation on the RF signal comprises:
   removing a cyclic prefix in the RF signal to obtain a third serial signal;
   performing a serial-to-parallel conversion on the third serial signal to obtain N third parallel signals;
   performing discrete fast Fourier transform (DFFT) on the N third parallel signals to obtain N fourth parallel signals;
   performing parallel-to-serial conversion on the N fourth parallel signals to obtain a fourth serial signal; and
   performing channel estimation on the fourth serial signal to obtain a first demodulated signal.

5. The signal processing method according to claim 4, wherein the performing the PSK demodulation on the first demodulated signal comprises:
   using an 8-PSK demodulation algorithm to perform the PSK demodulation on the first demodulated signal.

6. The signal processing method according to claim 4, wherein the decoding the second demodulated signal comprises:
   using a Gray code decoding algorithm to decode the second demodulated signal.

7. An RFID system, comprising an RFID electronic tag and an RFID reader, wherein
   the RFID electronic tag encodes a digital baseband signal to obtain a coded signal;
   the RFID electronic tag performs a PSK modulation on the coded signal to obtain a first modulated signal;
   the RFID electronic tag performs an OFDM modulation on the first modulated signal to obtain a second modulated signal;
   the RFID electronic tag sends the second modulated signal to the RFID reader;
   the RFID reader receives the second modulated signal from the RFID electronic tag;
   the RFID reader performs an OFDM demodulation on the second modulated signal to obtain a first demodulated signal;
   the RFID reader performs a PSK demodulation on the first demodulated signal to obtain a second demodulated signal; and
   the RFID reader decodes the second demodulated signal to obtain the digital baseband signal;
   wherein the RFID electronic tag performing the OFDM modulation on the first modulated signal further comprises:

the RFID electronic tag inserts pilots to the first modulated signal to obtain a first serial signal;

the RFID electronic tag performs a serial-to-parallel conversion on the first serial signal to obtain N first parallel signals, N being the number of subcarriers;

the RFID electronic tag performs an inverse discrete fast Fourier transform (IDFFT) on the N first parallel signals to obtain N second parallel signals;

the RFID electronic tag performs a parallel-to-serial conversion on the N second parallel signals to obtain a second serial signal; and the RFID electronic tag adds cyclic prefixes to the second serial signal to obtain the second modulated signal.

* * * * *